United States Patent Office 2,842,586
Patented July 8, 1958

2,842,586

PROCESS FOR OBTAINING ALCOHOLYSIS OF AMINOACID ESTERS

Emil Kaiser and Ellen P. Gunther, Chicago, Ill., assignors to Armour and Company, Chicago, Ill., a corporation of Illinois No Drawing. Application June 2, 1955
Serial No. 512,856

10 Claims. (Cl. 260—470)

This invention relates to an improved process for obtaining alcoholysis of an ester.

The chemical phenomenon involving an exchange of the alcohol component of an ester for another alcohol may be termed alcoholysis. This alcoholysis reaction has been obtained by reaction of an ester with an alcohol in the presence of a catalyst. This reaction can be illustrated by the formula $$R \cdot COOR' + R''OH \rightleftarrows R \cdot COOR'' + R'OH$$

wherein R, R' and R'' represent different organic radicals. This alcoholysis reaction has been catalyzed by aluminum alcoholates. The reaction results in an equilibrium which may be induced towards completion, i. e. in the direction of the upper arrow, by employing therein a large excess of either of the reactants (compounds on the left side of the equilibrium) or by removing either of the reaction products (compounds on the right side of the equilibrium) from the reaction mixture. The inducement of this type of reaction towards completion has conventionally been accomplished by employing a large excess of R''OH in the reaction mixture or by separating a lower boiling R'OH from the reaction mixture by distillation.

The aluminum alcoholates have not only been employed in the alcoholysis reaction in catalytic concentrations, but have also been utilized as reactants. In this type of reaction there is obtained interchange of the alcohol component of the ester with that of the aluminum alcoholate. This reaction can be illustrated by the formula $$3R \cdot COOR' + Al[OR'']_3 \rightleftarrows 3R \cdot COOR'' + Al[OR']_3$$

wherein R, R' and R'' represent different organic radicals. The aluminum alcoholate should be employed in this type of reaction in a concentration at least substantially stoichiometric to that of the ester. The inducement of this type of reaction towards completion has been conventionally obtained by separating the R·COOR'' reaction product from the reaction mixture during the course of the reaction.

It has been the practice to employ in these alcoholysis reactions only ester reactants characterized by being in the liquid state to obtain ester reaction products also in liquid form. The ester reactants subjected to alcoholysis in the aluminum alcoholate type reaction have been further limited to those esters which are capable of forming ester alcoholysis products (1) which may be separated from the reaction mixture during the course of the reaction by evaporation, i. e. where R·COOR'' is lower boiling than R·COOR', or (2) having a molecular weight higher than that of such ester reactant, i. e. where R·COOR' has a molecular weight lower than that of R·COOR''. It can be seen that the alcoholysis processes heretofore employed in the art are extremely limited with respect to the character of the esters which may be reacted therein or obtained as reaction products, especially in that such ester reactants and ester reaction products have been limited to those esters normally in the liquid state.

Accordingly, it is an object of this invention to provide an alcoholysis process in which the ester reactant is characterized by being in solid form. Another object is to provide an alcoholysis process in which the ester reactant and ester reaction product are characterized by being in solid form. A further object is to provide an alcoholysis process in which the ester reactant may have a boiling point lower than that of the ester reaction product. Still another object is to provide an alcoholysis process in which the ester reactant may have a molecular weight higher than that of the ester reaction product. A still further object is to provide an alcoholysis reaction which can proceed to completion while all of the reactants and reaction products are maintained in the reaction mixture. Other objects and advantages will become apparent as the specification proceeds.

In one aspect of this invention alcoholysis of an ester may be obtained by reacting, in a suitable reaction medium, at least substantially stoichiometric proportions of an aluminum alcoholate and an ester characterized by being in the solid state. We have found that the ester alcoholysis product of this reaction may be obtained in substantially quantitative yield even though it is possible to maintain all of the reactants and reaction products in the reaction mixture until alcoholysis has been completed. For the purposes of this invention, an "ester characterized by being in the solid state" means an ester which is a solid under atmospheric conditions, i. e. at a temperature within the range of about 10 to 50° C. under atmospheric pressure or, more particularly, at room temperature (about 25° C.).

These esters may be any solid organic compound of the type obtained by the condensation of an organic acid with an alcohol. They may be derived from such organic acids as aliphatic, aromatic, cyclic, branched chain, etc., and although the organic acids from which these esters are derived may contain any acid radical, i. e. sulfonyl, carboxyl etc., they are preferably derived from organic acids of the carboxyl type. These esters should not contain radicals, other than an alcohol component, capable of entering into the alcoholysis reaction, and in the event that the ester reactant does contain potentially reactive groups other than the alcohol component such groups may be protected by substitution with a non-reactive radical. Better alcoholysis may be achieved with solid esters which are also insoluble in water, and especially desirable results may be obtained with solid esters further characterized by being capable of forming ester alcoholysis products which are also in the solid state. As suitable solid ester reactants for this alcoholysis process, we mention, for example, those esters containing an organic acid component derived from organic acids such as lauric acid, p-toluene-sulfonic acid, p-nitrobenzoic acid, etc.

In another aspect of this invention, alcoholysis may be obtained by reacting, in a suitable solvent medium, at least substantially stoichiometric proportions of an aluminum alcoholate and an amino acid ester derivative. For the purposes of this invention, "derivative" means that only the alcohol component of the amino acid ester reactant should be capable of exchanging with the alcohol component of the aluminum alcoholate reactant, and that any free amino group therein should be protected from entering into the alcoholysis reaction, i. e. rendered non-reactive, by, for example, substitution with an acyl radical. This substitution of free amino groups can be obtained by the well-known process of acylation. For example, p-toluenesulfonylglycine methyl ester can be reacted with a substantially stoichiometric proportion of aluminum isopropoxide in anhydrous isopropyl alcohol to obtain p-toluenesulfonylglycine isopropyl ester in a yield of more than 90% without separating any of the reactants and reaction products from the reaction medium during the course of the reaction.

Preferably these amino acid ester derivatives are in the solid state, while better results are obtained with amino acid ester derivatives which are also water insoluble, and especially desirable alcoholysis can be achieved with solid amino acid esters further characterized by being capable of forming amino acid ester alcoholysis products also in the solid state. As suitable amino acid ester derivatives, we mention, for example, those derivatives of esters of such amino acids as glycine, isoleucine, p-nitrobenzoic acid, etc. As a suitable acyl radical for rendering free amino groups of such esters non-reactive, we mention, for example, toulenesulfonyl.

Although the alcohol component of this ester reactant may be derived from any alcohol, such as aliphatic, aromatic, cyclic, branched chain, etc., better results may be achieved with esters containing an alcohol component derived from an alkyl alcohol. Especially desirable alcoholysis may be obtained with an ester reactant having an alkoxyl group which contains less than 6 carbon atoms. As esters suitable for alcoholysis in this process, we mention, for example, those esters of the aforementioned type which contain alcohol components derived from such alcohols as, methanol, ethanol, propanol, isopropanol, butanol, benzyl, methyl amyl, allyl, etc.

The aluminum acoholate reactant of this alcoholysis process may be an aluminum derivative of any organic alcohol, such as aliphatic, aromatic, cyclic, branched chain, etc. As suitable aluminum alcoholate reactants, we mention, for example, aluminum derivatives of such alcohols as fatty alcohols, glycerol, benzyl alcohol, isopropanol, methanol, ethanol, propanol, butanol, methyl amyl alcohol, allyl alcohol, benzyl alcohol, ethylenechlorohydrin, etc.

The reaction medium for this alcoholysis process should be a solvent for the ester and aluminum reactants, i. e. it should be an organic liquid in which the ester and aluminum alcoholate reactants may be dissolved. Also, this solvent medium should be such as not to interefere with the alcoholysis reaction. This solvent medium may be an organic solvent such as chlorinated organic compounds, hydrocarbons, oxygenated organic compounds, etc. As suitable solvents we mention, for example, such organic compounds as carbon tetrachloride, dimethyl formamide, toluene, etc. Especially desirable results are obtained when this solvent medium includes an alcohol corresponding to the alcohol component of the aluminum alcoholate reactant.

In the preferred practice of this invention alcoholysis of a suitable ester may be obtained by first combining metallic aluminum and an alcohol in a solvent medium, and refluxing the resulting mixture for a period of time sufficient to obtain an aluminum alcoholate reaction product, e. g. about 1 hour. Then, the ester may be dissolved in the aluminum alcoholate solution. The concentration of ester and aluminum alcoholate should be such as to produce at least substantially stoichiometric proportions thereof in the solvent medium. We have found that especially desirable alcoholysis may be achieved when the concentration of aluminum alcoholate reactant in the solvent medium is about 10 to 20% in excess of the stoichiometric concentration of ester reactant. The resulting reaction medium can then be refluxed for a period of time sufficient to obtain completion of the alcoholysis reaction. We have found that under refluxing conditions, this reaction may be completed in a period of at least 4 hours. Preferably, however, the reaction is continued for at least about 6 hours, and in some instances a period of 8 hours or more may be required to obtain complete alcoholysis.

After completion of the alcoholysis reaction the reaction mixture may be cooled to about room temperature and mixed with acidified water. The resulting organic phase may be separated from the aqueous phase and dried over a drying agent, such as sodium sulfate. The dried organic phase may then be evaporated to dryness to obtain the ester alcoholysis product in the solid state.

This invention can be more fully illustrated by the following specific examples:

Example I

Metallic aluminum (0.0067 mole) was combined with 50 ml. of toluene, and to the resulting mixture was added carbon tetrachloride and a few crystals of mercuric chloride as catalysts. Then, allyl alcohol, in an amount equivalent to 0.06 mole (three times the amount required for the aluminum alcoholate formation), was added, and the resulting mixture stirred while refluxing for a period of 1 hour.

Then, 0.02 mole of tosylglycine methyl ester was added to this aluminum alcoholate solution, and reaction thereof obtained by refluxing with continuous agitation for a period of 4 hours. The reaction mixture was cooled, and extracted with 100 ml. of water containing 6 ml. of hydrochloric acid. The organic layer thereupon formed was separated from the aqueous phase and washed with water until neutral. The separated aqueous layers were pooled and extracted with toluene. The separated organic layer and this toluene extract were combined and dried over sodium sulfate. The organic solvent was evaporated in vacuo, and the resulting dry ester reaction product was mixed with petroleum ether (boiling point 40–60° C.). The resulting mixture was stored in a refrigerator, whereupon a precipitate of the reaction product was obtained and collected in a Buchner funnel by filtration.

This alcoholysis product was obtained in a yield of 88%, and identified as tosylglycine allyl ester. The melting point of the crude product was 56–59° C., while that of the recrystallized product was 59–61° C. The nitrogen content of this reaction product was calculated as 5.20%, while the value obtained on analysis was 5.28%.

Example II

Additional alcoholysis products of tosylglycine methyl ester, having a melting point of 91–93° C. and a nitrogen content of 5.76, were obtained according to the method of Example I, as follows:

The ester was reacted with aluminum benzyl alcoholate to obtain tosylglycine benzyl ester; aluminum 1-methylamyl alcoholate to obtain tosylglycine 1-methylamyl ester; and aluminum isopropyl alcoholate to obtain tosylglycine isopropyl ester.

The results of these alcoholysis reactions are presented in the following table:

| Ester Reaction Product | Yield (percent) | Calculated Nitrogen Content (percent) | Analyzed Nitrogen Content (percent) | Melting Point of Crude Product (degrees C.) | Melting Point of Recrystallized Product (degrees C.) |
|---|---|---|---|---|---|
| Benzyl | 84 | 4.39 | 4.45 | 79–81 | 80–82 |
| 1-methylamyl | 89 | 4.51 | 4.49 | 56–58 | |
| Isopropyl | 91.5 | 5.16 | 5.28 | 78–80 | 76–80 |

Example III

The kinetics of this alcoholysis reaction were demonstrated, as follows:

Aluminum isopropoxide, 12.6 gms. (0.05 mole plus 20% excess), was dissolved in toluene, and the resulting solution diluted with additional toluene to a volume of 500 ml.

Tosylglycine methyl ester (0.15 mole) was dissolved in hot toluene, and the resulting solution diluted with additional hot toluene to a volume of 1 l. The aluminum isopropoxide and ester solutions were mixed, and the resulting mixture refluxed with continuous agitation. During the course of the alcoholysis reaction, 50 ml. aliquots of the reaction mixture were removed at selected time intervals.

After withdrawal, each of these aliquots was immediately added to 50 ml. of dilute hydrochloric acid (11 ml. of concentrated hydrochloric acid in 1000 ml. of water) to decompose the aluminum alcoholate reaction product. The toluene layer thereupon formed was washed with water until neutral, dried over sodium sulfate, and evaporated in vacuo.

Each aliquot of evaporated reaction product was analyzed for nitrogen content, and the results were as follows:

| Time Interval (Minutes) | Analyzed Nitrogen Content (percent) | Calculated Nitrogen Content (percent) |
|---|---|---|
| 0 | 5.75 | 5.76 for methyl ester. |
| 1 | 5.71 | |
| 2.5 | 5.70 | |
| 5.0 | 5.69 | |
| 10.0 | 5.68 | |
| 15.0 | 5.60 | |
| 22.0 | 5.53 | |
| 30.0 | 5.39 | |
| 60.0 | 5.32 | |
| 120.0 | 5.31 | |
| 180.0 | 5.29 | |
| 240.0 | 5.25 | |
| 360.0 | 5.19 | 5.16 for isopropyl ester. |

*Example IV*

The rate of alcoholysis of tosylglycine methyl ester was further demonstrated, as follows:

Tosylglycine methyl ester in the amount of 1.815 gms., was dissolved in 50 ml. of toluene, and heated to refluxing temperature. Aluminum isopropoxide, in the amount of 0.63 gm., in 25 ml. of boiling toluene was added to the ester solution, and the resulting mixture was refluxed for a selected period of time. Then, the reaction mixture was poured into 75 ml. of ice-cold dilute hydrochloric acid solution (11 ml. of concentrated hydrochloric acid diluted to 1000 ml. with water). The toluene layer thereupon formed was separated from the aqueous layer, washed to neutrality with water, dried over sodium sulfate, and evaporated in vacuo. The dry residue obtained at each selected time interval was analyzed for nitrogen content, and the results were as follows:

| Time Interval (Minutes) | Analyzed Nitrogen Content (percent) |
|---|---|
| 0 | 5.75 |
| 2 | 5.75 |
| 4 | 5.70 |
| 6 | 5.67 |
| 8 | 5.63 |
| 10 | 5.62 |

*Example V*

Metallic aluminum, in the amount of 198 mg. (0.0067 mole), was combined with 50 ml. of toluene, 1 ml. of carbon tetrachloride and a few crystals of mercuric chloride. To the resulting mixture was added 4.83 gms. (0.06 mole) of ethylenechlorohydrin. The resulting mixture was refluxed, while stirring, until the aluminum had been dissolved.

Tosylglycine methyl ester, in the amount of 4.8 gms. (0.02 mole), was added to this aluminum alcoholate solution, and the resulting solution refluxed, while stirring, for a period of 4 hours. Then, the reaction mixture was cooled and extracted with 6 ml. of concentrated hydrochloric acid in 100 ml. of water. The toluene layer thereupon formed was separated from the aqueous layer, washed with water until neutral, dried over sodium sulfate, and distilled in vacuo. The dry residue thereby obtained was mixed with Skelly F, and the ester reaction product obtained as a precipitate therein upon standing in the cold. This precipitate was extracted with Skelly F, separated by filtration, and evaporated to dryness.

This dry ester reaction product was obtained in a yield of 4.7 gms. and identified as tosylglycine ethylenechlorhydrin ester having a melting point of 60–62° C. with cloudiness and clearing up at 72° C. The calculated nitrogen content for this ester was 4.80%, while that found upon analysis was 5.12%.

This ester reaction product was recrystallized from an ether-Skelly F solvent mixture, and obtained in a yield of 3.3 gms. This recrystallized product had a melting point of 58–68° C. (clear) and a nitrogen content of 5.12%. This nitrogen content indicated that a minor proportion of tosylglycine methyl ester was contained in the reaction product.

*Example VI*

Tosylglycine methyl ester, in the amount of 4.8 gms., was mixed with 0.2 gm. of metallic aluminum, 1 ml. of carbon tetrachloride, a few crystals of mercuric chloride and 20 ml. of 2-chloroethoxide. The resulting mixture was refluxed for a period of 4 hours with continuous agitation. Then, a solution containing 6 ml. of hydrochloric acid and 200 ml. of water was added to the reaction mixture. The precipitate thereupon formed was separated from the supernatant liquid by filtration, washed, and dried. The nitrogen content for this ester reaction product was calculated at 4.80%, and while that determined upon analysis was 4.87%.

It can be seen that when 2-chloroethoxide was substituted for toluene (Example V) as the solvent medium for the reaction, alcoholysis was completed in four hours, and the tosylglycine ethylene chlorohydrin ester reaction product obtained in high yield with excellent purity.

*Example VII*

Tosylglycine methyl ester, in the amount of 1.6 gms., was dissolved in 20 ml. isopropyl alcohol. To this solution was added 0.45 gm. of aluminum isopropoxide. The resulting reaction mixture was refluxed for a period of 4 hours, and cooled to room temperature. Then, an aqueous solution of sodium potassium tartrate was added to the cooled solution, and the precipitate thereupon formed was separated by filtration and dried.

The nitrogen content of this ester reaction product was calculated as 5.16%, while that found upon analysis was 5.14%. The molecular weight of the ester reactant was 319, while that of the ester reaction product was 271.

*Example VIII*

This aluminum alcoholate procedure was applied to several esters, and the results thereof are presented in the following table:

| Starting Material | Al Alcoholate | Product | Analysis of Product |
|---|---|---|---|
| Tosylisoleucine methyl ester, M. P. 69–70°. | isopropyl | tosylisoleucine isopropyl ester. | Percent N (found) 4.24. Percent N (calcd) 4.26. M. P. 65–67°. |
| p-Nitrobenzoic acid ethyl ester: Percent N (found) 7.11 Percent N (calcd) 7.17 | ethylenechlorohydrin | p-nitrobenzoic acid ethylene-chlorohydrin ester. | Percent N found 6.37. Percent N (calcd) 6.10. |

Example IX

Tosylglycine methyl ester, having a melting point of 92–94° C. and a nitrogen content of 5.76% (calculated) and 5.75% (analyzed), in the amount of 4.8 gms. (0.02 mole), and 1.7 gms. aluminum isopropoxide (0.0067 mole plus 20% excess) were dissolved in 30 ml. of anhydrous isopropanol. The resulting solution was refluxed for a period of 4 hours. After cooling, 200 ml. of water and 6 ml. of hydrochloric acid were added to the reaction mixture. Then, after standing for 1 hour, the crystalline precipitate thereupon formed was separated by filtration and dried. The yield of dry ester reaction product was 5.1 gms.

This ester reaction product had a melting point of 81–82° C., and, the nitrogen content thereof was calculated as 5.16%, while the value found on analysis was 5.15%. Thus, the yield of tosylglycine isopropyl ester was 94%.

Example X

When 0.4 gm. of aluminum isopropoxide was employed in the ester alcoholysis process set forth in Example IX, instead of 1.7 gms. used therein, the resulting ester reaction product had a melting point of 92–93° C. This melting point was similar to that of the ester reactant, and indicated that alcoholysis had not been obtained.

Example XI

Metallic aluminum, in the amount of 0.2 gm., was mixed with 4.14 gms. of allyl alcohol in 50 ml. of toluene. Catalytic amounts of mercuric chloride and carbon tetrachloride were also added. The resulting mixture was refluxed, while stirring, for a period of one hour. Then 4.8 gms. of tosylglycine methyl ester was added to the reaction mixture, and refluxing was continued for a period of 4 hours. Thereafter, the reaction mixture was cooled and extracted with 100 ml. of water containing 6 ml. of concentrated hydrochloric acid. The toluene layer thereupon formed was separated from the aqueous extract, washed with water until neutral, and dried over sodium sulfate. The toluene was removed by distillation in vacuo, and the ester reaction product mixed with Skelly F and stored in the cold overnight. The precipitate thereupon formed was separated from the Skelly F and dried. This dry ester reaction product was obtained in a yield of 4.4 gms., this was 82% of the calculated yield. The nitrogen content of this product was calculated as 5.20%, while the value found on analysis was 5.22%.

Example XII

Benzyl alcohol, in the amount of 12.8 gms., was mixed with 1.0 gm. of metallic aluminum, 1 ml. of carbon tetrachloride and a few crystals of mercuric chloride. After refluxing this mixture for a period of 1 hour, 18.6 gms. of methyl p-toluenesulfate was added, and refluxing continued for an additional 4 hours. After the reaction mixture had been cooled, ether was added, and the precipitate thereupon formed was separated by filtration. The separated filtrate was concentrated in vacuo, while precipitate was re-extracted with ether. This second ether extract was evaporated in vacuo, and the resulting concentrate obtained as a dark oil.

The molecular weight of benzyl-p-toluenesulfonate is 262, while the molecular weight determined from the saponification number of this ester reaction product was 291. This indicated that the ester reaction product contained residual benzyl alcohol. This residual benzyl alcohol was removed by washing with water, drying over sodium sulfate and evaporating in vacuo. The molecular weight of the purified compound was found to be 254 as determined from the saponification number.

Example XIII p-Tosylglycine methyl ester, in the amount of 4.8 gms., and 1.5 gms. of aluminum isopropoxide, were dissolved in 50 ml. of carbon tetrachloride. The resulting solution was refluxed, and then stored overnight. The precipitate thereupon formed was separated from the reaction mixture by filtration. The yield of ester reaction product was 0.9 gm., while the calculated yield value was 0.88 gm.

In the course of filtration, the clear filtrate commenced to crystallize. Consequently, this filtrate was stored until crystallization had been completed, and then the crystals were separated by filtration and washed with carbon tetrachloride. The resulting product was evaporated to dryness and identified as tosylglycine isopropyl ester having a melting point of 78–80° C. The nitrogen content of this reaction product was calculated as 5.16%, while that obtained on analysis was 5.19%.

Example XIV p-Tosylglycine methyl ester was prepared from tosylglycine benzyl ester by the following alcoholysis process:

Metallic aluminum, in an amount equivalent to $\frac{1}{800}$ mole plus 10% excess, was mixed with a few crystals of mercuric chloride and 0.5 ml. of carbon tetrachloride in 50 ml. of methanol. The resulting mixture was refluxed, while stirring, for a period of 1 hour. Then, $\frac{1}{100}$ mole of p-tosylglycine benzyl ester, containing 4.42% of nitrogen, was added, and the resulting solution was refluxed for an additional 26 hours. Insoluble matter formed in the reaction mixture during alcoholysis was separated by filtration, and the resulting filtrate poured into 400 ml. of water containing 6 ml. of concentrated hydrochloric acid. This mixture was stored in the cold, and the precipitate thereupon formed was separated by filtration. This precipitate was dried in vacuo over calcium chloride.

The nitrogen content calculated for this ester reaction product was 5.76%, while the value found on analysis was 5.70%.

Example XV p-Tosylglycine isopropyl ester was prepared from p-tosylglycine methyl amyl ester by the following alcoholysis process:

p-Tosylglycine methyl amyl ester, containing 4.49% of nitrogen, in an amount equivalent to $\frac{1}{100}$ mole, was dissolved in 50 ml. of isopropyl alcohol together with aluminum isopropoxide, in an amount equivalent to $\frac{1}{150}$ mole, and 50 ml. of toluene. The resulting solution was refluxed for a period of 26 hours, and the insoluble matter formed in the reaction mixture during refluxing was separated by filtration. The resulting filtrate was poured into 400 ml. of water containing 6 ml. of concentrated hydrochloric acid. The toluene layer thereupon formed was separated from the aqueous layer and mixed with Skelly F. This Skelly F mixture was stored in the cold, and the precipitate thereupon formed was separated by filtration, washed with Skelly F, and dried.

The nitrogen content calculated for this ester reaction product was 5.16%, while the value found upon analysis was 5.12%.

Example XVI p-Tosylglycine isopropyl ester was prepared from tosylglycine benzyl ester by the following alcoholysis process:

Metallic aluminum, in an amount equivalent to $\frac{1}{800}$ mole plus 10% excess, was mixed with a few crystals of mercuric chloride and 0.5 ml. of carbon tetrachloride in 25 ml. of isopropyl alcohol. The resulting mixture was refluxed for a period of one hour, then $\frac{1}{200}$ mole of p-tosylglycine benzyl ester, containing 4.40% of nitrogen, was added and the resulting solution refluxed for an additional 5 hours.

Insoluble matter formed in the reaction mixture during refluxing was separated by filtration, and the resulting filtrate poured into 400 ml. of acidified water and stored in the cold. The precipitate thereupon formed was separated by filtration and dried in vacuo over calcium chloride.

The calculated nitrogen content for the ester reaction product was 5.16%, while the value found upon analysis was 5.09%.

*Example XVII* p-Tosylglycine methyl ester was prepared from p-tosylglycine isopropyl ester by the following alcoholysis process:

Metallic aluminum, in an amount equivalent to $\frac{1}{600}$ mole plus 10% excess, was mixed with a few crystals of mercuric chloride and 1 ml. of carbon tetrachloride in 50 ml. of methanol. The resulting mixture was refluxed for a period of 1 hours, then $\frac{1}{200}$ mole of p-tosylglycine isopropyl ester, containing 5.19% of nitrogen, was added, and the resulting solution refluxed for an additional 77 hours. Insoluble matter formed in the reaction mixture during alcoholysis was separated by filtration, and the resulting filtrate poured into 400 cc. of acidified water. This aqueous mixture was stored in the cold, and the precipitate thereupon formed was separated by filtration and dried in vacuo over calcium chloride.

The calculated nitrogen content of this ester reaction product was 5.76%, while the value found upon analysis was 5.70%.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:

1. In an alcoholysis reaction wherein there is obtained substantially complete interchange of the alcohol component of an ester with that of an aluminum alcoholate, the steps of reacting at least substantially stoichiometric proportions of an aluminum alcoholate and an amino acid ester derivative in which only the alcohol component is capable of undergoing alcoholysis under reflux conditions in a solvent medium containing essentially a solvent selected from the group consisting of a solvent in which the reactants are soluble but in which the aluminum alcoholate reaction product is substantially insoluble and an alcohol corresponding to the alcohol component of the aluminum alcoholate reactant, while maintaining the reactants and the reaction products in contact with the solvent medium until the reaction has been substantially completed, and then separating the amino acid ester reaction product from the reaction mixture.

2. The alcoholysis reaction of claim 1 in which said amino acid ester is a solid amino acid ester.

3. In an alcoholysis reaction wherein there is obtained substantially complete interchange of the alcohol component of an ester with that of an aluminum alcoholate, the steps of refluxing for a period of at least four hours at least substantially stoichiometric proportions of an aluminum alcoholate and a toluene-sulfonyl amino acid ester in a solvent medium containing essentially a solvent selected from the group consisting of a solvent in which the reactants are soluble but in which the aluminum alcoholate reaction product is substantially insoluble and an alcohol corresponding to the alcohol component of the aluminum alcoholate reactant, while maintaining the reactants and reaction products in contact with the solvent medium until the reaction has been substantially completed, and separating the toluenesulfonyl amino acid ester reaction product from the reaction mixture.

4. The alcoholysis reaction of claim 3 in which the alcohol component of the toluenesulfonyl amino acid ester is a benzyl alcohol component.

5. The alcoholysis reaction of claim 3 in which the alcohol component of the toluenesulfonyl amino acid ester is an alkoxyl group containing less than 6 carbon atoms.

6. The alcoholysis reaction of claim 3 in which the aluminum alcoholate reactant contains less than 6 carbon atoms.

7. The alcoholysis reaction of claim 4 in which the toluenesulfonyl amino acid ester is a toluenesulfonyl glycine ester.

8. The alcoholysis reaction of claim 5 in which the toluenesulfonyl amino acid ester is a toluenesulfonyl isoleucine ester.

9. In an alcoholysis reaction represented by the formula

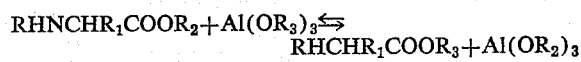

wherein R is a blocking substituent group which prevents reaction of the amino group of the amino acid during the alcoholysis reaction and which is easily removable by conventional means, $R_1$ is a radical selected from the group consisting of hydrogen and a monovalent radical occurring in naturally occurring amino acids, $R_2$ and $R_3$ are selected from the group consisting of the hydrocarbon radicals of alkyl, aryl, cycloalkyl and alkylaryl alcohols, and wherein there is obtained substantially complete interchange of the alkoxyl group of the aluminum alcoholate with the alkoxyl group of the amino acid ester, the step of reacting substantially stoichiometric proportions of the reactants in the presence of a solvent in which the reactants $RHNCHR_1COOR_2$ and $Al(OR_3)_3$ are substantially soluble and in which $Al(OR_2)$ is substantially insoluble.

10. In an alcoholysis reaction represented by the formula

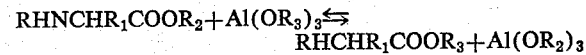

wherein R is a blocking substituent group which prevents reaction of the amino group of the amino acid during the alcoholysis reaction and which is easily removable by conventional means, $R_1$ is a radical selected from the group consisting of hydrogen and a monovalent radical occurring in naturally occurring amino acids, $R_2$ and $R_3$ are selected from the group consisting of the hydrocarbon radicals of alkyl, aryl, cycloalkyl and alkylaryl alcohols, and wherein there is obtained substantially complete interchange of the alkoxyl group of the aluminum alcoholate with the alkoxyl group of the amino acid ester, the step of reacting substantially stoichiometric proportions of the reactants in the presence of an alcohol corresponding to the alcohol component of the alcohol aluminate reactant.

References Cited in the file of this patent

UNITED STATES PATENTS

| | | |
|---|---|---|
| 2,476,052 | Lippincott | July 12, 1949 |
| 2,711,402 | Fletcher | June 21, 1955 |
| 2,720,506 | Caldwell et al. | Oct. 11, 1955 |

OTHER REFERENCES

Groggins: "Unit Processes in Organic Synthesis," pp. 616 to 620 (1952).